United States Patent
Valliappan et al.

(10) Patent No.: US 9,967,833 B2
(45) Date of Patent: May 8, 2018

(54) ADAPTING BASIC SERVICE SET BASIC RATE SET FOR 802.11 WIRELESS LOCAL AREA NETWORKS

(71) Applicant: QUALCOMM Incorporated, San Diego, CA (US)

(72) Inventors: Nachiappan Valliappan, San Diego, CA (US); Ahmed Kamel Sadek, San DIego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 377 days.

(21) Appl. No.: 14/275,594

(22) Filed: May 12, 2014

(65) Prior Publication Data

US 2015/0163753 A1 Jun. 11, 2015

Related U.S. Application Data (60) Provisional application No. 61/914,575, filed on Dec. 11, 2013.

(51) Int. Cl.
| | | |
|---|---|---|
| *H04W 52/26* | (2009.01) | |
| *H04W 74/00* | (2009.01) | |
| *H04W 52/24* | (2009.01) | |
| *H04W 84/12* | (2009.01) | |
| *H04W 72/12* | (2009.01) | |
| *H04W 28/02* | (2009.01) | |

(52) U.S. Cl.
CPC ..... *H04W 52/267* (2013.01); *H04W 28/0221* (2013.01); *H04W 28/0236* (2013.01); *H04W 74/002* (2013.01); *H04W 28/0205* (2013.01); *H04W 52/241* (2013.01); *H04W 72/1215* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,369,510 B1 | 5/2008 | Wong et al. | |
| 7,542,421 B2 | 6/2009 | Srikrishna et al. | |
| 8,085,733 B2* | 12/2011 | Roy | H04L 1/0015 370/230 |
| 8,457,089 B2 | 6/2013 | Trainin | |
| 2012/0218979 A1 | 8/2012 | Yeh et al. | |

(Continued)

FOREIGN PATENT DOCUMENTS

EP 1686753 A1 8/2006

OTHER PUBLICATIONS

International Search Report and Written Opinion—PCT/US2014/069516—ISA/EPO—dated Mar. 24, 2015.

(Continued)

*Primary Examiner* — Huy D Vu
*Assistant Examiner* — Hong Shao
(74) *Attorney, Agent, or Firm* — MG-IP Law, P.C.

(57) ABSTRACT

Adaption of a Basic Service Set (BSS) Basic Rate Set for a Wireless Local Area Network (WLAN) Access Point (AP) may be achieved by, for example, determining a transmission power metric for one or more Subscriber Stations (STAs) associated with the AP, modifying one or more data rates in the BSS Basic Rate Set for the AP based on the transmission power metric, and transmitting the modified BSS Basic Rate Set to the one or more STAs.

40 Claims, 8 Drawing Sheets

(56) References Cited

U.S. PATENT DOCUMENTS

2013/0010844 A1* 1/2013 Amini ............... H04L 1/0015
375/219
2014/0106802 A1* 4/2014 Cheng ............... H04W 72/12
455/509

OTHER PUBLICATIONS

Poncini V.M., et al., "Optimizing Transmission Rate Selection in Basic Service Sets," IP.com No. IPCOM000188114D, 3504176v2, Sep. 22, 2009, 21 pages.

* cited by examiner

ADAPTING BASIC SERVICE SET BASIC RATE SET FOR 802.11 WIRELESS LOCAL AREA NETWORKS

CROSS-REFERENCE TO RELATED APPLICATION

The present application for patent claims the benefit of U.S. Provisional Application No. 61/914,575, entitled "ADAPTING BASIC SERVICE SET BASIC RATE SET FOR 802.11 WIRELESS LOCAL AREA NETWORKS," filed Dec. 11, 2013, assigned to the assignee hereof, and expressly incorporated herein by reference in its entirety.

INTRODUCTION

Aspects of this disclosure relate generally to telecommunications, and more particularly to rate set adaptation for Wireless Local Area Networks (WLANs) and the like.

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). One class of such multiple-access systems is generally referred to as "Wi-Fi," and includes different members of the Institute of Electrical and Electronics Engineers (IEEE) 802.11 wireless protocol family. Generally, a Wi-Fi communication system can simultaneously support communication for multiple wireless stations (STAs). Each STA communicates with one or more access points (APs) via transmissions on the downlink and the uplink. The downlink (DL) refers to the communication link from the APs to the STAs, and the uplink (UL) refers to the communication link from the STAs to the APs.

As part of their Basic Service Set (BSS) management, APs maintain a Basic Rate Set, which is the list of rates every STA joining the network is required to support. The BSS Basic Rate Set is advertised by the AP in various beacon, probe response, and association/re-association frames sent to the STAs. Any frame sent to a group receiver address is required by various Wi-Fi standards to be sent at one of the rates in the Basic Rate Set, ensuring that all STAs in the BSS are able to properly decode it. Control frames such as request-to-send/clear-to-send (RTS/CTS) frames are also required by various Wi-Fi standards to be transmitted at one of the rates in the Basic Rate Set. Control response frames such as acknowledgement (ACK) or block ACK and CTS frames are also required by various Wi-Fi standards to be sent at one of the rates in the Basic Rate Set, but with a particular one-to-one mapping to the rate of the transmission prompting the response.

Currently, most Wi-Fi APs advertise a fixed set of rates for the BSS Basic Rate Set, which can be suboptimal for both coverage and DL throughput performance. For example, there is usually a transmit power mismatch between the APs and the STAs, which may lead to packet losses as relatively underpowered STAs try to close the UL with ACK frames at the high rates required for correspondingly high rate DL transmissions. Because UL response frames such as ACKs are tied to the DL transmission rate and are required to be in the BSS Basic Rate Set as discussed above, DL throughput is often sacrificed to close the UL.

There accordingly remains a need for improved Basic Rate Set management for more efficient rate and decoding requirements.

SUMMARY

Systems and methods for Basic Rate Set adaption in a wireless communication system are disclosed.

A method of adapting a Basic Service Set (BSS) Basic Rate Set for a Wireless Local Area Network (WLAN) Access Point (AP) is disclosed. The method may comprise, for example: determining a transmission power metric for one or more Subscriber Stations (STAs) associated with the AP; modifying one or more data rates in the BSS Basic Rate Set for the AP based on the transmission power metric; and transmitting the modified BSS Basic Rate Set to the one or more STAs.

An apparatus for adapting a BSS Basic Rate Set for a WLAN AP is also disclosed. The apparatus may comprise, for example, a processor and memory coupled to the processor for storing data. The processor may be configured to, for example: determine a transmission power metric for one or more STAs associated with the AP, modify one or more data rates in the BSS Basic Rate Set for the AP based on the transmission power metric, and transmit the modified BSS Basic Rate Set to the one or more STAs; and memory coupled to the processor for storing data.

Another apparatus for adapting a BSS Basic Rate Set for a WLAN AP is also disclosed. The apparatus may comprise, for example: means for determining a transmission power metric for one or more STAs associated with the AP; means for modifying one or more data rates in the BSS Basic Rate Set for the AP based on the transmission power metric; and means for transmitting the modified BSS Basic Rate Set to the one or more STAs.

A computer-readable medium comprising code, which, when executed by a processor, causes the processor to perform operations for adapting a BSS Basic Rate Set for a WLAN AP is also disclosed. The computer-readable medium may comprise, for example: code for determining a transmission power metric for one or more STAs associated with the AP; code for modifying one or more data rates in the BSS Basic Rate Set for the AP based on the transmission power metric; and code for transmitting the modified BSS Basic Rate Set to the one or more STAs.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

In relation to the background above, the disclosure relates in some aspects to Basic Rate Set adaption, so that various response frames may use lower rates with lower decoding requirements. In this way, the typically UL-limited transmit power in a given Wi-Fi network may be made sufficient to close the UL for corresponding DL transmissions.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
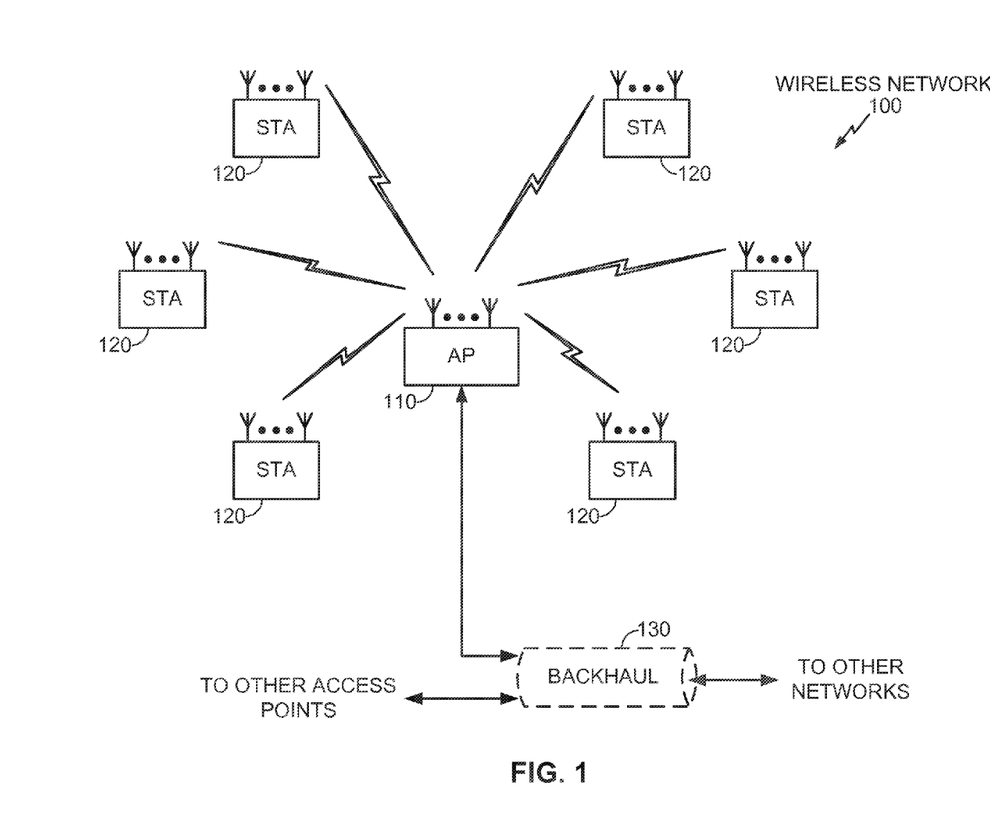
FIG. 1 illustrates an example wireless network.

FIG. 1 illustrates an example wireless network 100. As shown, the wireless network 100, which may also be referred to herein as a basic service set (BSS), is formed from several wireless nodes, including an access point (AP) 110 and a plurality of subscriber stations (STAs) 120. Each wireless node is generally capable of receiving and/or transmitting. The wireless network 100 may support any number of APs 110 distributed throughout a geographic region to provide coverage for the STAs 120. For simplicity, one AP 110 is shown in FIG. 1, providing coordination and control among the STAs 120, as well as access to other APs or other networks (e.g., the Internet) via a backhaul connection 130.

The AP 110 is generally a fixed entity that provides backhaul services to the STAs 120 in its geographic region of coverage. However, the AP 110 may be mobile in some applications (e.g., a mobile device serving as a wireless hotspot for other devices). The STAs 120 may be fixed or mobile. Examples of STAs 120 include a telephone (e.g., cellular telephone), a laptop computer, a desktop computer, a personal digital assistant (PDA), a digital audio player (e.g., MP3 player), a camera, a game console, a display device, or any other suitable wireless node. The wireless network 100 may be referred to as a wireless local area network (WLAN), and may employ a variety of widely used networking protocols to interconnect nearby devices. In general, these networking protocols may be referred to as "Wi-Fi," including any member of the Institute of Electrical and Electronics Engineers (IEEE) 802.11 wireless protocol family.

In Wi-Fi, each node communicates with another node according to one or more supported physical layer (PHY) data rates. In 802.11b, for example, the supported data rates are 1, 2, 5.5, and 11 Megabits per second (Mbps), in the 2.4 Gigahertz (GHz) frequency band. In 802.11a, the supported data rates are 6, 9, 12, 18, 24, 36, 48, and 54 Mbps, in the 5.2 GHz frequency band. For 802.11g, the supported data rates are 1, 2, 5.5, 6, 9, 11, 12, 18, 24, 36, 48, and 54 Mbps, in the 2.4 GHz frequency band. For 802.11n, however, the transmission rates are more complex. A modulation and coding scheme (MCS) is used to specify the transmission rate. MCS includes variables for the modulation scheme, the number of spatial streams, and the data rate on each stream. Different BSSs may support different levels of throughput between nodes, including high throughput (HT) (e.g., in IEEE 802.11n systems), very high throughput (VHT) (e.g., in IEEE 802.11ac systems), and non-HT (e.g., in IEEE 802.11a/b/g systems).

Each STA may have its own supported data rate set, as defined by a particular Operational Rate Set in conjunction with a Basic Rate Set for the BSS. The BSS Basic Rate Set refers to a set of data transfer rates which all STAs joining the BSS must basically support, and is generally advertised by the AP in beacon frames, probe response frames, and other control, association, or re-association response frames to the STAs. As used herein, the BSS Basic Rate Set may include variants such as the BSS Basic MCS Set used in IEEE 802.11n (which is the set of MCS values that must be supported by all HT STAs to join the BSS), the VHT Basic MCS Set used in IEEE 802.11ac (which is the set of MCS values for each number of spatial streams that must be supported by all VHT STAs to join the BSS), etc. By contrast, the Operational Rate Set is a super-set that may include the BSS Basic Rate Set but also other (typically higher) data transfer rates which may be used for communication to, from, and between the STAs within the BSS.

When an AP and an STA are communicating, the node receiving a data packet transmits an acknowledgement (ACK) packet after the data packet is successfully received. The 802.11 wireless protocol family defines specific rules for selecting an ACK packet data rate. In particular, the ACK packet data rate is selected from the BSS Basic Rate Set, with a one-to-one mapping defined between the rate used in the received data packet and the rate selected for the response ACK packet. The 802.11 protocol family of standards specifies, for example, that the ACK packet transmit rate is selected as the highest rate in the BSS Basic Rate Set (using the same MCS if available, or using an equivalent non-HT rate) that is not higher than the rate used in the previously received packet. As an example of HT to non-HT rate conversion, if necessary, Table 1 below illustrates conversion for 802.11n systems where the advertised BSS Basic Rate Set includes only 802.11a (non-HT packet) rates.

TABLE 1

| Modulation | Coding Rate (R) | Non-HT Reference Rate (Mb/s) |
|---|---|---|
| BPSK | 1/2 | 6 |
| BPSK | 3/4 | 9 |
| QPSK | 1/2 | 12 |
| QPSK | 3/4 | 18 |
| 16-QAM | 1/2 | 24 |
| 16-QAM | 3/4 | 36 |
| 64-QAM | 1/2 | 48 |
| 64-QAM | 2/3 | 48 |
| 64-QAM | 3/4 | 54 |
| 64-QAM | 5/6 | 54 |

Returning to FIG. 1, the AP 110 and the STAs 120 may operate at different transmit power levels, resulting in a power imbalance between the STAs 120 and the AP 110. For example, since the STAs 120 are often battery powered devices, their maximum transmit power is usually substantially lower than the transmit power of the AP 110. This may be especially true for smartphones and other small devices. Further, the STAs 120 may have different maximum transmit power values for each MCS based on their respective Error Vector Magnitudes (EVMs) and other considerations. As a result, the STAs 120 typically use a lower PHY rate for their data packets while the AP 110 transmits at a higher rate. Because, however, the 802.11 protocol family of standards specifies that the ACK packet PHY rate is dependent on the transmit rate used by the transmitting device (in particular, one rate below the corresponding transmit rate), the STAs 120 may be required to send their ACK packets at a higher rate than their data packets.

As discussed in the background above, this may result in an increased packet error rate for UL ACK packets because the limited UL transmit power levels supported by the STAs cannot support the relatively high PHY rate at which the ACK packets are specified to be transmitted. In conventional systems, in response to failing to properly receive the ACK packets, the AP 110 may reduce its DL PHY rate to a rate approximating the UL PHY rate used by the STAs 120 for transmitting at their lower power level in order to close the UL, thereby disadvantageously sacrificing DL throughput from the AP 110 to the STA 120.

Figure 2:
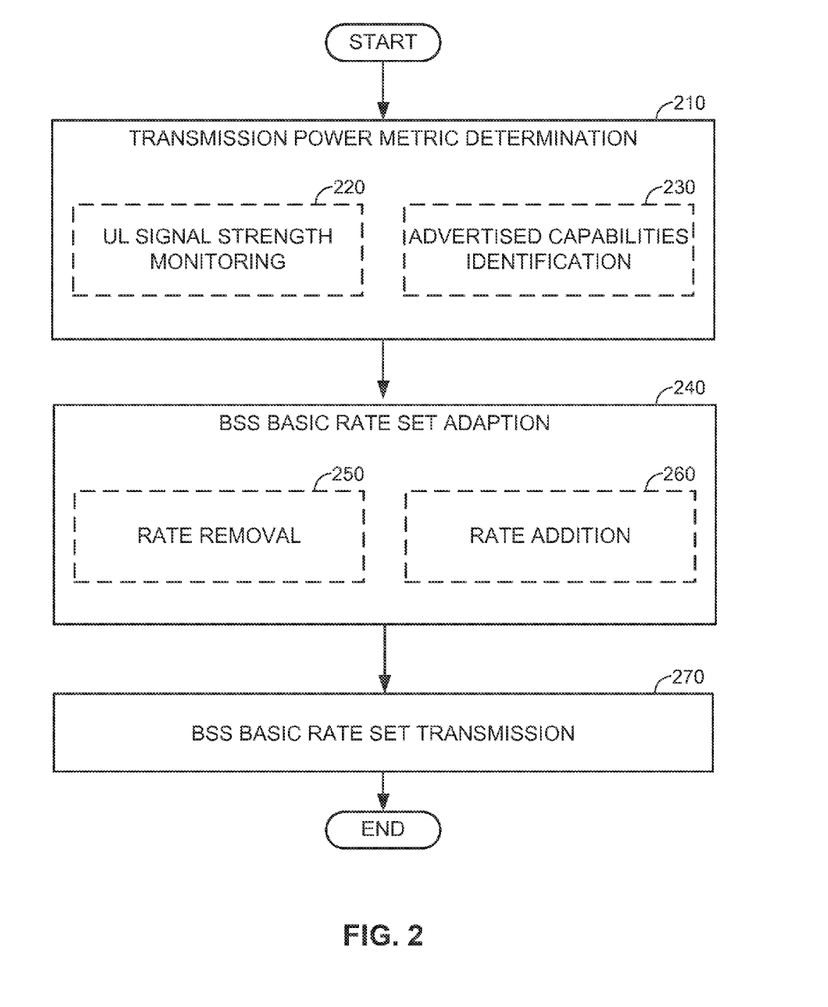
FIG. 2 is a processing flow diagram illustrating an example method of adapting a Basic Rate Set.

FIG. 2 is a processing flow diagram illustrating an example method of adapting the BSS Basic Rate Set to facilitate more efficient ACK and other response frame rate and decoding requirements. In general, an AP performing the Basic Rate Set adaptation (e.g., the AP 110 in FIG. 1) may be configured to determine a transmission power metric for one or more STAs (e.g., the STAs 120 in FIG. 1) associated with the AP (processing block 210), and to modify the data rates in the BSS Basic Rate Set for the AP based on the transmission power metric (processing block 240). The modified BSS Basic Rate Set may then be transmitted to the STAs and employed for future BSS operation (processing block 270).

Different transmission power metrics may be used for the BSS Basic Rate Set adaptation. For example, the transmission power metric may correspond to an uplink signal strength measure and be determined by monitoring the uplink signal strength (e.g., received signal strength indicator (RSSI)) of various packets received from the one or more STAs (processing block 220). This approach takes into account Tx/Rx antenna gains, path loss between the AP and STA, etc. As another example, the transmission power metric may correspond to a transmission power capability of the STAs, determined by reading the (e.g., maximum and minimum) transmission powers from a power capabilities element advertised by each of the STAs (processing block 230). This approach is simpler, as there is no need for continuous monitoring or processing of different STA signaling.

Figure 3:
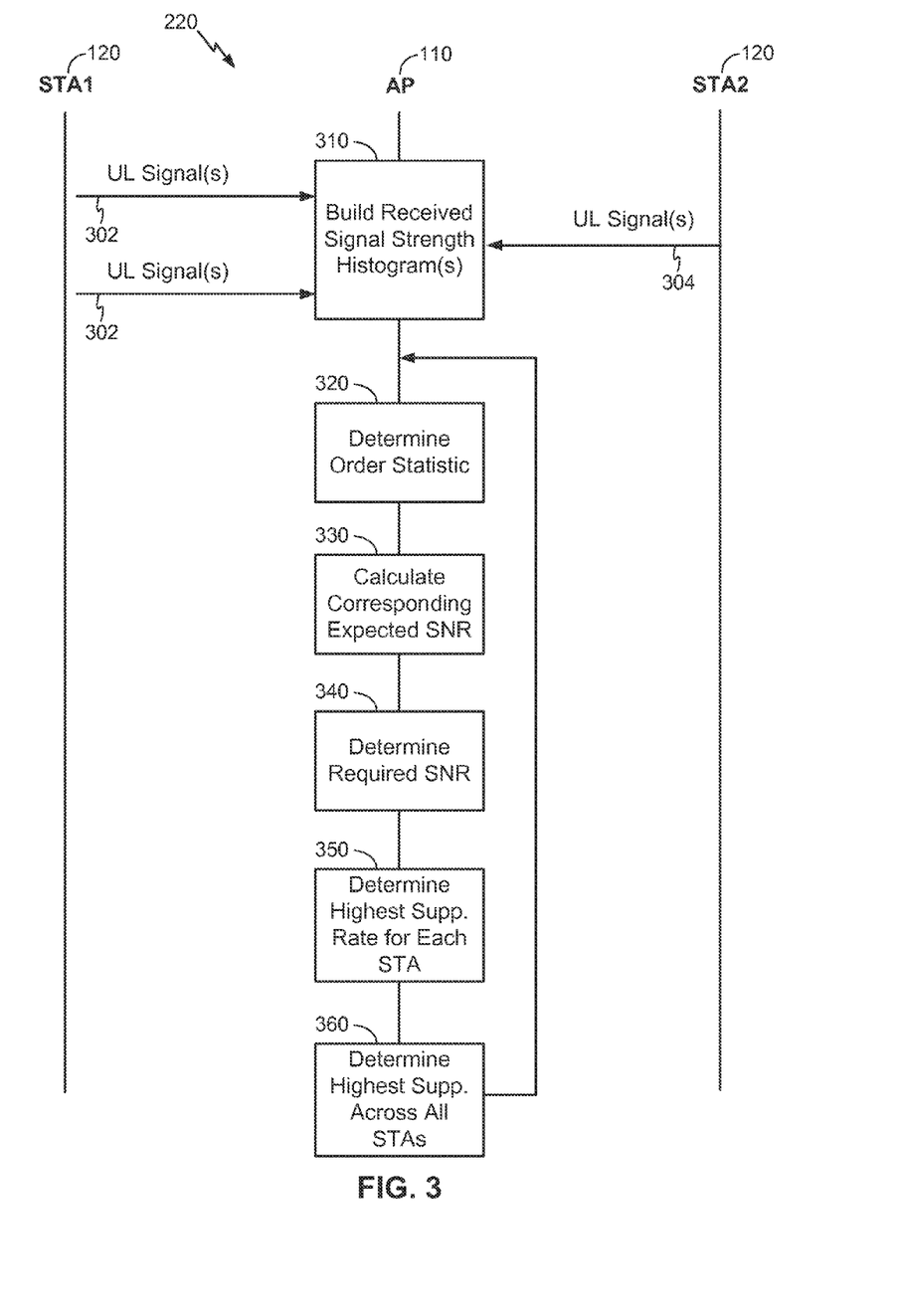
FIG. 3 is a signaling flow diagram illustrating an example method of uplink signal strength monitoring.

FIG. 3 is a signaling flow diagram illustrating an example method of uplink signal strength monitoring (processing block 220 in FIG. 2). In this example, the AP (e.g., the AP 110 in FIG. 1) is associated with a first STA ("STA1," e.g., one of the STAs 120 in FIG. 1) and a second STA ("STA2," e.g., another one of the STAs 120 in FIG. 1). Through continual or periodic monitoring and processing of uplink signals 302 from the first STA and uplink signals 304 from the second STA, the AP builds a histogram of signal strengths for each STA (block 310). The histograms may be updated over a sliding time window, for example, to capture the movement of the STAs within the BSS while keeping the information up-to-date. The AP may also maintain the list of basic rates supported by the STAs from the capabilities advertised in the messages exchanged during association.

Based on the histograms for each STA, the AP may determine an order statistic reflective of channel conditions and relating to an available uplink margin, as observed empirically through the histogram measurement distribution (block 320). For example, the AP may use the tenth percentile, the median, etc., as an indication of the expected received signal strength for each STA. The AP may then calculate a corresponding expected Signal-to-Noise Ratio (SNR) for ACK packets arriving with the expected received signal strength of the order statistic (block 330). For a given downlink rate issued by the AP to a given STA, the corresponding ACK rate will be known based on the one-to-one mapping discussed above. Accordingly, the AP may also calculate the SNR needed to decode that ACK rate based on a predefined table or the like residing at the AP (block 340).

The AP may then compare the expected SNR for each STA (obtained at block 330) to the stored SNR value required to decode an uplink transmission for the STA's current ACK rate (obtained at block 340) to determine the highest supported rate for each STA for the uplink (block 350). For example, if the realizable SNR based on the uplink signal strength statistic and noise floor measurement at the AP indicates that the uplink ACK cannot be decoded, the AP may calculate the next lowest rate at which the ACK is decodable and record it in a database. Otherwise, if the realizable SNR based on the uplink signal strength statistic and noise floor measurement at the AP indicates that the uplink ACK can be decoded, no change is necessary to accommodate this STA. The highest rate supported among all of the STAs may then be determined (e.g., as the minimum supported ACK rate among all such STAs) (block 360) for use in modifying the BSS Basic Rate Set, if necessary, to reflect the highest supported rate common to the BSS.

Figure 4:
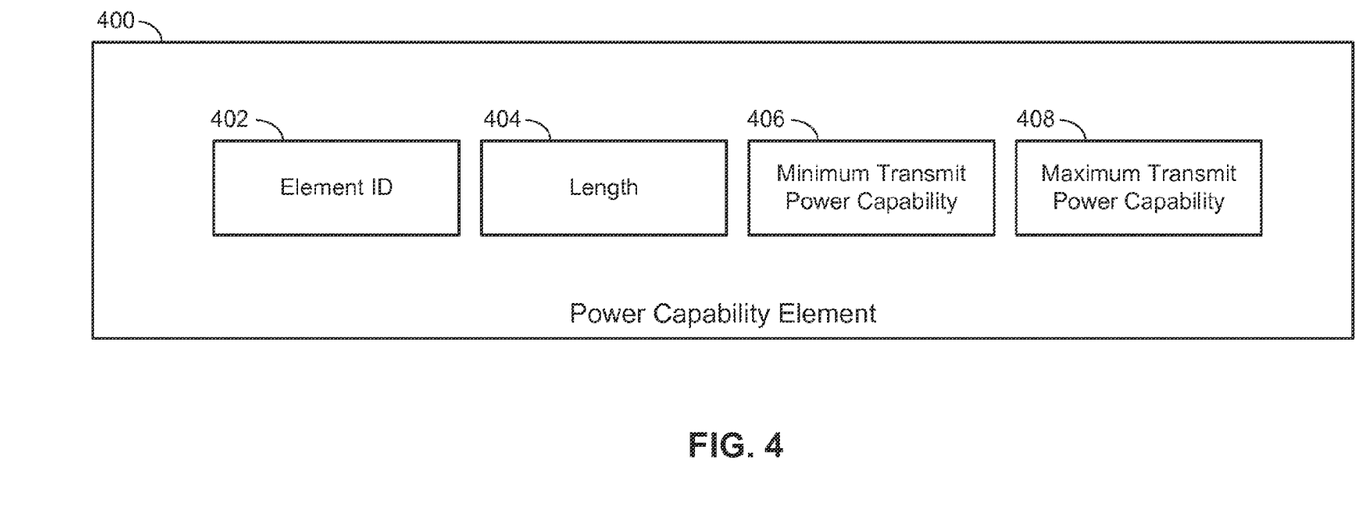
FIG. 4 illustrates an example power capability element.

FIG. 4 illustrates an example power capability element for conveying the minimum and maximum transmit powers with which an STA is capable of transmitting, which may be used to determine the maximum supported ACK rate in the BSS (processing block 230 in FIG. 2). As shown, the power capability element 400 may be transmitted in the form of an Information Element (IE), with the format of an element ID 402, a length field 404, and data fields that carry the contents of the IE that are being conveyed, including in this case a minimum transmit power capability field 406 and a maximum transmit power capability field 408. The Length field may define where the IE ends (e.g., two octets). The Element ID may define the type of the IE, which in turn defines how the contents of the remaining fields may be interpreted. In this example, the minimum transmit power capability field 406 specifies the nominal minimum transmit power with which the STA is capable of transmitting in the current channel, and the maximum transmit power capability field 408 specifies the nominal maximum transmit power with which the STA is capable of transmitting in the current channel. The maximum transmit power for each STA may be compared to a threshold corresponding to one or more decoding requirements, for example, to determine the highest rate supported among all of the STAs.

Returning to FIG. 2, regardless of the particular transmission power metric employed, the resulting highest rate supported by all of the STAs in the BSS may be used to modify the supported rates in the BSS Basic Rate Set for the AP (processing block 240). The modified BSS Basic Rate Set may then be transmitted and employed for future BSS operation (processing block 270). For its part, each STA may modify any stored Basic Rate Set information it may have locally to match the advertised BSS Basic Rate Set from the AP.

Removal of an existing rate from the BSS Basic Rate Set (block 250), when appropriate, can generally be performed by the AP without any risk to STA operation, and therefore freely advertised in the AP's beacon frame and future probe response or association/re-association response frames, etc. However, when a new basic rate is added to the BSS Basic Rate Set (block 260), the AP may need to reassess the supported rates of all associated STAs based on, for example, the capabilities advertised in the original association/re-association response frames from those STAs when they joined the BSS (which may be stored by the AP for such purposes). If all STAs support the new rate that the rate adaptation algorithm determines to be added, the AP may add it to the BSS Basic Rate Set and advertise it in future beacon, probe response, and association/re-association response frames. If one or more STAs do not support the new rate (e.g., because they were associated at a time when the BSS Basic Rate Set was limited), the AP may either decide to not update the BSS Basic Rate Set until the limiting STA disassociates from the BSS, or the AP may force its disassociation.

Figure 5:
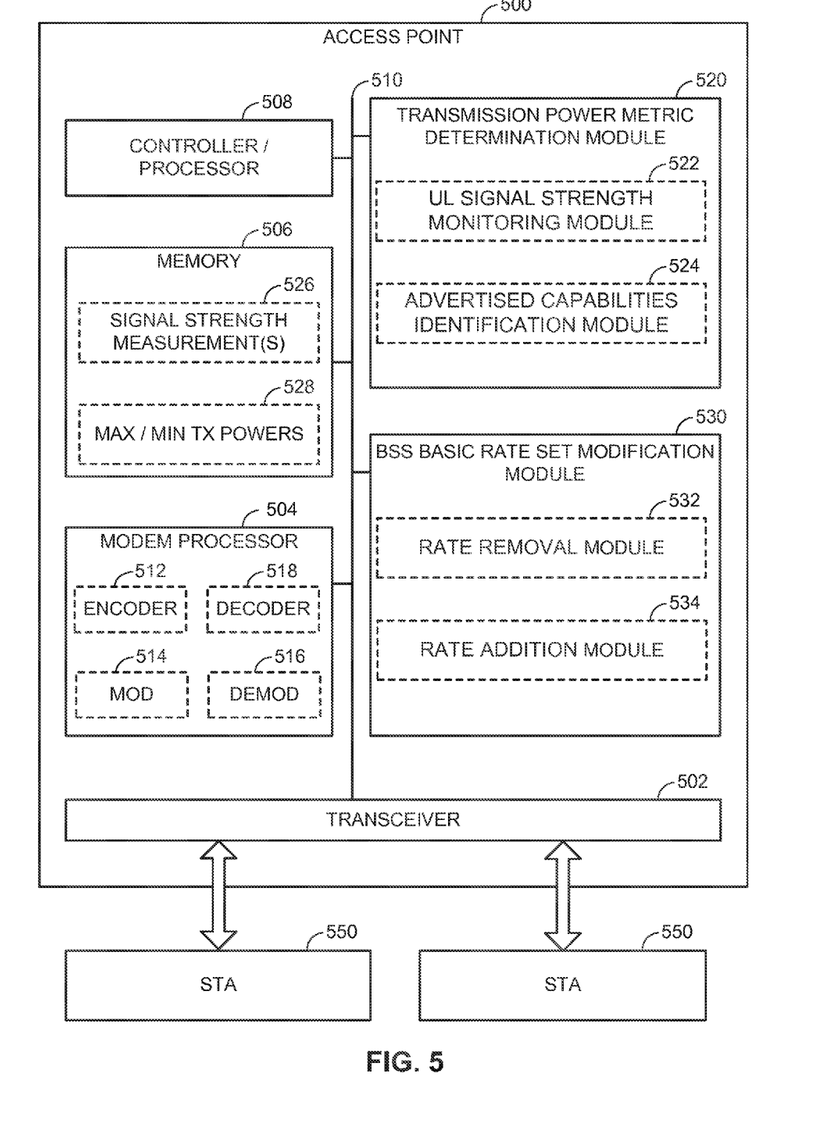
FIG. 5 illustrates an example access point configured to support Basic Rate Set adaption.

FIG. 5 illustrates an example AP configured to support BSS Basic Rate Set adaption. As shown, the illustrated AP 500 may generally include various hardware components for communicating with one or more STAs 550 according to a Wi-Fi communication protocol.

On the transmit path, traffic data to be sent by the AP 500 may be processed (e.g., formatted, encoded, and interleaved) by an encoder 512 and further processed (e.g., modulated, channelized, and scrambled) by a modulator (Mod) 514 to generate an output signal. A transceiver 502 may then condition (e.g., convert to analog, filter, amplify, and upconvert) the output signal and transmit it via one or more associated antennas. On the receive path, the transceiver 502 may receive signals transmitted from the illustrated STAs 550. The transceiver 502 may then condition (e.g., filter, amplify, downconvert, and digitize) the received signal and provide samples. A demodulator (Demod) 516 may process (e.g., descramble, channelize, and demodulate) the samples and provide symbol estimates. A decoder 518 may further process (e.g., deinterleave and decode) the symbol estimates and provide decoded data.

The encoder 512, modulator 514, demodulator 516, and decoder 518 may form a modem processor 504, as shown. The AP 500 may also include one or more general purpose controllers or processors (illustrated in the singular as the controller/processor 508) and memory 506 configured to store related data or instructions. Together, via a bus 510, these units may perform processing in accordance with the Wi-Fi protocol to provide communication services to the STAs 550, as well as other functions for the AP 500.

To facilitate BSS Basic Rate Set adaption, the AP 500 further includes a transmission power metric determination module 520 and a BSS Basic Rate Set modification module 530. The transmission power metric determination module 520 may be configured to determine a transmission power metric for one or more of the STAs 550 associated with the AP 500. The BSS Basic Rate Set modification module 530 may be configured to modify the data rates in the BSS Basic Rate Set for the AP 500 based on the transmission power metric, as discussed in more detail above.

For example, the transmission power metric determination module 520 may be configured to determine the transmission power metric by monitoring the uplink signal strength (e.g., RSSI) of packets received from the one or more STAs 550 (e.g., via an uplink signal strength monitoring sub-module 522), and storing them in memory (e.g., as the illustrated signal strength measurement(s) 526 stored in the memory 506). Over time, the transmission power metric determination module 520 may be able to build a histogram of signal strengths for each of the STAs 550 (e.g., over a sliding time window). In this way, the transmission power metric determination module 520 may be able determine an order statistic (e.g., tenth percentile, median, etc.) from the histogram, calculate an expected SNR based on the order statistic, and compare the expected SNR to one or more stored SNR values required to decode the uplink transmission to determine the highest supported rate for the STA 550 for the uplink. The transmission power metric determination module 520 may then be able to determine the highest rate supported among all of the STAs 550, such that the BSS Basic Rate Set modification module 530 may be able to modify (e.g., via a rate removal sub-module 532 or a rate addition sub-module 534) the data rates in the BSS Basic Rate Set to reflect the highest supported rate.

As another example, the transmission power metric determination module 520 may be configured to determine the transmission power metric by reading the maximum and minimum transmission powers from a power capabilities element advertised by each of the STAs 550 (e.g., via an advertised capabilities identification sub-module 524), and storing them in memory (e.g., as the illustrated max and min Tx powers 528 stored in the memory 506). In this way, the BSS Basic Rate Set modification module 530 may be able to modify the data rates in the BSS Basic Rate Set (e.g., via the rate removal sub-module 532 or the rate addition sub-module 534) based on a threshold comparison of the maximum transmission powers among the STAs 550.

In any case, the AP 500 may transmit the modified BSS Basic Rate Set (e.g., via the transceiver 502), and the STAs 550 may modify any locally stored Basic Rate Set information they may have to match the advertised the BSS Basic Rate Set from the AP 500.

It will be appreciated that, in some designs, the functionality of the transmission power metric determination module 520 and/or the BSS Basic Rate Set modification module 530 may be integrated directly into, or otherwise performed by, the general purpose controller/processor 508 of the AP 500, in conjunction with the memory 506 as appropriate. In either case, the BSS Basic Rate Set adaption processing may be performed in different ways, as discussed in more detail above in the context of the illustrated flow diagram(s).

Figure 6:
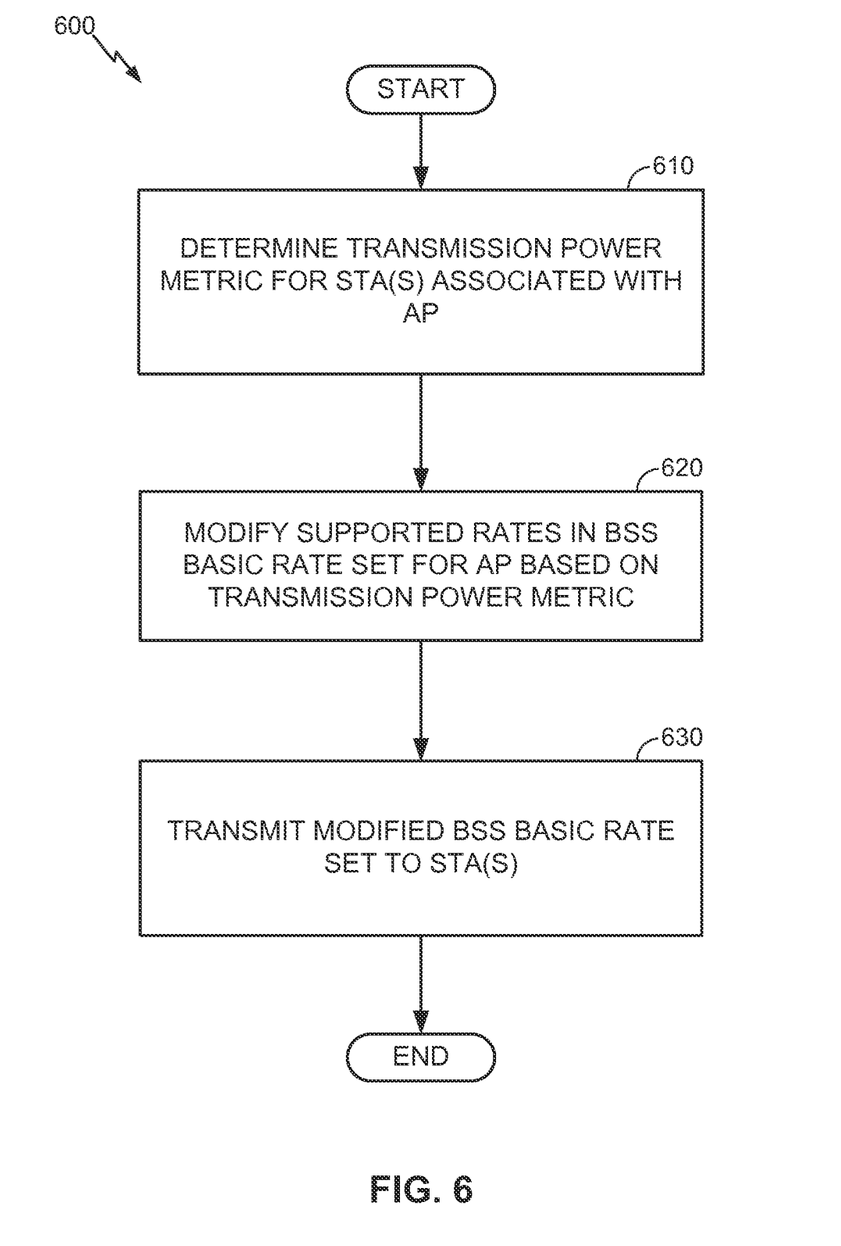
FIG. 6 is a flow diagram illustrating an example method of adapting a Basic Rate Set.

FIG. 6 is a flow diagram illustrating an example method of adapting a BSS Basic Rate Set for a WLAN AP. As shown, the method 600 may include determining a transmission power metric for one or more STAs associated with the AP (block 610), and modifying the data rates in the BSS Basic Rate Set for the AP (e.g., adding or removing at least one data rate to or from the BSS Basic Rate Set for the AP) based on the transmission power metric (block 620). The method 600 may also include transmitting the modified BSS Basic Rate Set (e.g., via broadcasting a beacon frame) to the one or more STAs (block 630). Each STA may then modify any stored Basic Rate Set information it may have to match the advertised the BSS Basic Rate Set from the AP.

As an example, determining the transmission power metric may comprise monitoring an uplink signal strength of packets received from the one or more STAs. Monitoring the uplink signal strength may comprise, for example, building a histogram of signal strength measurements for each of the one or more STAs over a designated time period. Monitoring the uplink signal strength may further comprise, for each of the one or more STAs, determining (from the corresponding histogram) an order statistic reflective of channel conditions for the STA. In this way, an expected SNR may be calculated for an uplink transmission from the STA based on the order statistic, and the expected SNR may be compared to a stored SNR associated with a decoding requirement for the uplink transmission. The highest supported data rate for the STA may then be determined for the uplink transmission based on the comparison. The BSS Basic Rate Set modification may then be performed by determining the lowest data rate among the highest supported data rates for the one or more STAs, reflecting the highest common supported data rate for the BSS, and adding or removing a data rate to or from the BSS Basic Rate Set for the AP to conform to the highest common supported data rate for the BSS.

As another example, determining the transmission power metric may comprise reading a maximum transmission power value from a power capabilities element transmitted by each of the one or more STAs. The BSS Basic Rate Set modification may then be performed by comparing the maximum transmission power value for each STA to a decoding requirement threshold, determining the highest common supported data rate for the BSS based thereon, and adding or removing a data rate to or from the BSS Basic Rate Set for the AP to conform to the highest common supported data rate for the BSS.

As will be appreciated from the discussion herein, the BSS Basic Rate Set modification may be performed in a way that is independent from and therefore does not affect the Operational Rate Set established for any of the STAs.

Figure 7:
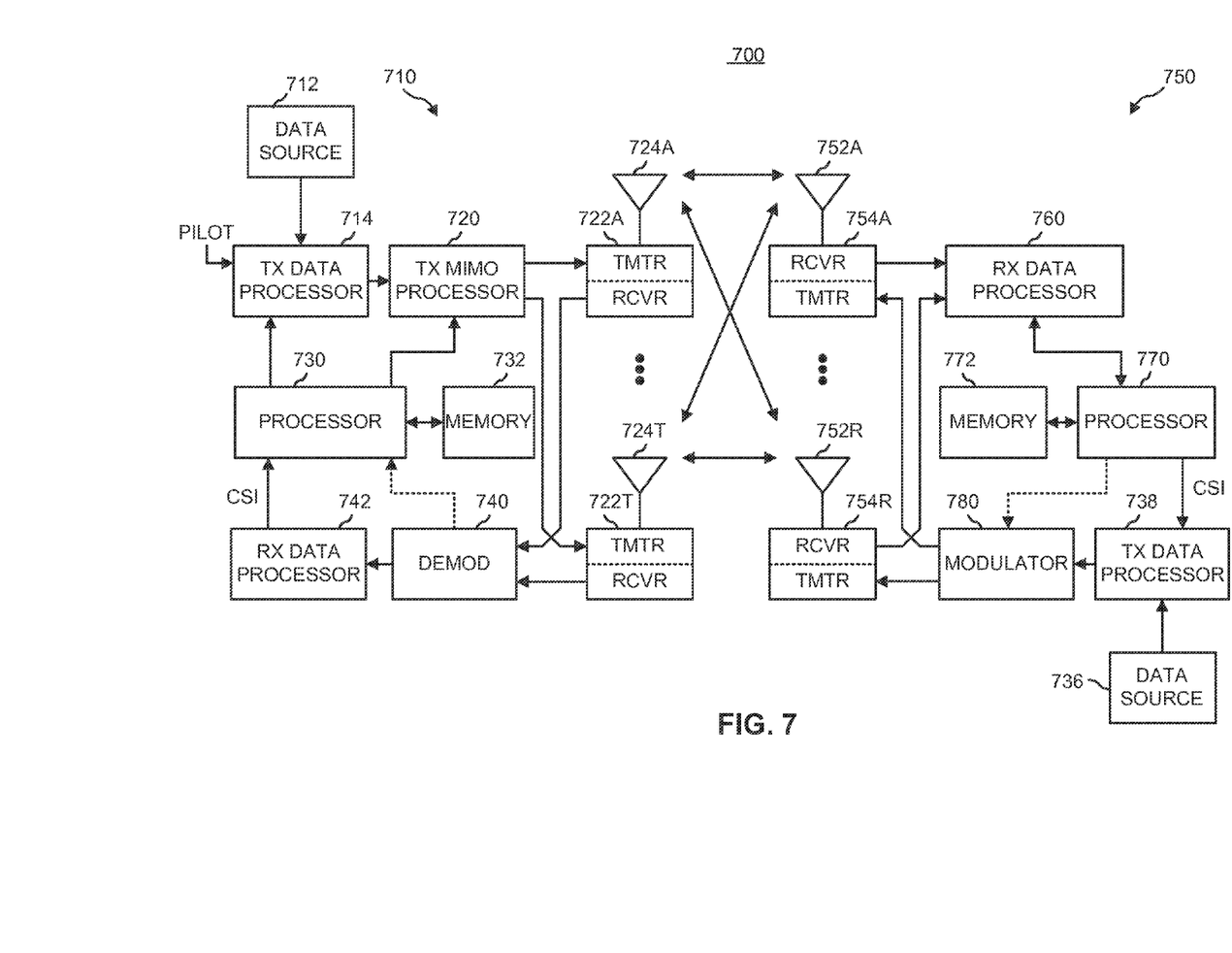
FIG. 7 illustrates in more detail the components of a wireless communication system.

FIG. 7 illustrates in more detail the components of a wireless device 710 (e.g., an AP) and a wireless device 750 (e.g., an STA) of a sample communication system 700 that may be adapted as described herein. At the device 710, traffic data for a number of data streams is provided from a data source 712 to a transmit (TX) data processor 714. Each data stream may then be transmitted over a respective transmit antenna.

The TX data processor 714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 730. A data memory 732 may store program code, data, and other information used by the processor 730 or other components of the device 710.

The modulation symbols for all data streams are then provided to a TX MIMO processor 720, which may further process the modulation symbols (e.g., for OFDM). The TX MIMO processor 720 then provides NT modulation symbol streams to NT transceivers (XCVR) 722A through 722T. In some aspects, the TX MIMO processor 720 applies beamforming weights to the symbols of the data streams and to the antenna from which the symbol is being transmitted.

Each transceiver 722 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 722A through 722T are then transmitted from NT antennas 724A through 724T, respectively.

At the device 750, the transmitted modulated signals are received by NR antennas 752A through 752R and the received signal from each antenna 752 is provided to a respective transceiver (XCVR) 754A through 754R. Each transceiver 754 conditions (e.g., filters, amplifies, and down-converts) a respective received signal, digitizes the conditioned signal to provide samples, and further processes the samples to provide a corresponding "received" symbol stream.

A receive (RX) data processor 760 then receives and processes the NR received symbol streams from NR transceivers 754 based on a particular receiver processing technique to provide NT "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 770 periodically determines which pre-coding matrix to use (discussed below). The processor 770 formulates a reverse link message comprising a matrix index portion and a rank value portion. A data memory 772 may store program code, data, and other information used by the processor 770 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754A through 754R, and transmitted back to the device 710.

At the device 710, the modulated signals from the device 750 are received by the antennas 724, conditioned by the transceivers 722, demodulated by a demodulator (DEMOD) 740, and processed by a RX data processor 742 to extract the reverse link message transmitted by the device 750. The processor 730 then determines which pre-coding matrix to use for determining the beam-forming weights then processes the extracted message.

It will be appreciated that for each device 710 and 750 the functionality of two or more of the described components may be provided by a single component. It will be also be appreciated that the various communication components illustrated in FIG. 7 and described above may be further configured as appropriate to perform BSS Basic Rate Set adaption as taught herein. For example, the processor 730 may cooperate with the memory 732 and/or other components of the device 710 to perform the BSS Basic Rate Set adaption as taught herein.

Figure 8:
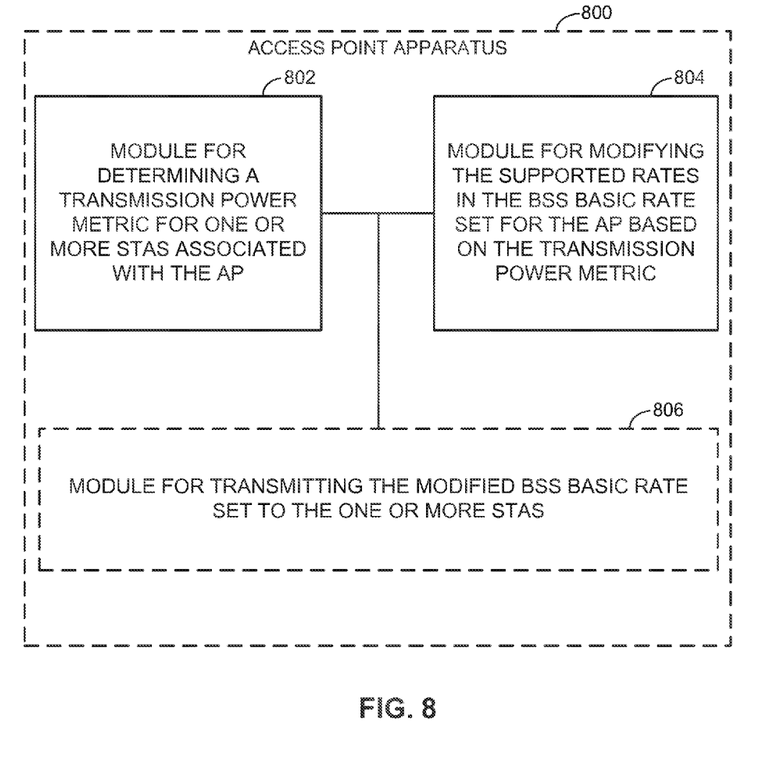
FIG. 8 illustrates an example access point apparatus represented as a series of interrelated functional modules.

FIG. 8 illustrates an example access point apparatus 800 represented as a series of interrelated functional modules. A module for determining 802 may correspond at least in some aspects to, for example, a processing system as discussed herein. A module for modifying 804 may correspond at least in some aspects to, for example, a processing system as discussed herein. A module for advertising 806 may correspond at least in some aspects to, for example, a communication device as discussed herein.

The functionality of the modules of FIG. 8 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 8 as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for Basic Rate Set in a wireless communication system. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of adapting a Basic Service Set (BSS) Basic Rate Set for a Wireless Local Area Network (WLAN) Access Point (AP), comprising:
    determining a transmission power metric for a plurality of Subscriber Stations (STAs) associated with the AP;
    modifying one or more data rates in the BSS Basic Rate Set for the AP based on the transmission power metric; and
    broadcasting the modified BSS Basic Rate Set in a beacon frame to each STA of the plurality of STAs in the BSS, wherein the modified BSS Basic Rate Set reflects a highest supported rate common to all of the plurality of STAs associated with the AP for transmissions from the plurality of STAs to the AP.

2. The method of claim 1, wherein the modifying does not affect an Operational Rate Set established for any of the plurality of STAs.

3. The method of claim 1, wherein the modifying comprises adding or removing at least one data rate to or from the BSS Basic Rate Set for the AP.

4. The method of claim 1, wherein the determining the transmission power metric comprises monitoring an uplink signal strength of packets received from the plurality of STAs.

5. The method of claim 4, wherein the monitoring the uplink signal strength comprises building a histogram of signal strength measurements for each of the plurality of STAs over a designated time period.

6. The method of claim 5, wherein the monitoring the uplink signal strength further comprises, for each of the plurality of STAs:
determining from the corresponding histogram an order statistic reflective of channel conditions for the STA;
calculating an expected Signal-to-Noise Ratio (SNR) for an uplink transmission from the STA based on the order statistic;
comparing the expected SNR to a stored SNR associated with a decoding requirement for the uplink transmission; and
determining a highest supported data rate for the STA for the uplink transmission based on the comparing.

7. The method of claim 6, wherein the modifying comprises:
determining a lowest data rate among the highest supported data rates for the plurality of STAs, reflecting a highest common supported data rate for the BSS; and
adding or removing a data rate to or from the BSS Basic Rate Set for the AP to conform to the highest common supported data rate for the BSS.

8. The method of claim 1, wherein the determining the transmission power metric comprises reading a maximum transmission power value from a power capabilities element transmitted by each of the plurality of STAs.

9. The method of claim 8, wherein the modifying the data rates comprises:
comparing the maximum transmission power value for each STA to a decoding requirement threshold;
determining a highest common supported data rate for the BSS based on the comparing; and
adding or removing a data rate to or from the BSS Basic Rate Set for the AP to conform to the highest common supported data rate for the BSS.

10. An apparatus for adapting a Basic Service Set (BSS) Basic Rate Set for a Wireless Local Area Network (WLAN) Access Point (AP), comprising:
a processor configured to:
determine a transmission power metric for a plurality of Subscriber Stations (STAs) associated with the AP,
modify one or more data rates in the BSS Basic Rate Set for the AP based on the transmission power metric, and
broadcast the modified BSS Basic Rate Set in a beacon frame to each STA of the plurality of STAs in the BSS; and
memory coupled to the processor for storing data,
wherein the modified BSS Basic Rate Set reflects a highest supported rate common to all of the plurality of STAs associated with the AP for transmissions from the plurality of STAs to the AP.

11. The apparatus of claim 10, wherein the processor is further configured to perform the modifying without affecting an Operational Rate Set established for any of the plurality of STAs.

12. The apparatus of claim 10, wherein the processor is further configured to modify the one or more data rates by adding or removing at least one data rate to or from the BSS Basic Rate Set for the AP.

13. The apparatus of claim 10, wherein the processor is further configured to determine the transmission power metric by monitoring an uplink signal strength of packets received from the plurality of STAs.

14. The apparatus of claim 13, wherein the processor is further configured to monitor the uplink signal strength by building a histogram of signal strength measurements for each of the plurality of STAs over a designated time period.

15. The apparatus of claim 14, wherein the processor is further configured to monitor the uplink signal strength by, for each of the plurality of STAs:
determining from the corresponding histogram an order statistic reflective of channel conditions for the STA;
calculating an expected Signal-to-Noise Ratio (SNR) for an uplink transmission from the STA based on the order statistic;
comparing the expected SNR to a stored SNR associated with a decoding requirement for the uplink transmission; and
determining a highest supported data rate for the STA for the uplink transmission based on the comparing.

16. The apparatus of claim 15, wherein the processor is further configured to modify the one or more data rates by:
determining a lowest data rate among the highest supported data rates for the plurality of STAs, reflecting a highest common supported data rate for the BSS; and
adding or removing a data rate to or from the BSS Basic Rate Set for the AP to conform to the highest common supported data rate for the BSS.

17. The apparatus of claim 10, wherein the processor is further configured to determine the transmission power metric by reading a maximum transmission power value from a power capabilities element transmitted by each of the plurality of STAs.

18. The apparatus of claim 17, wherein the processor is further configured to modify the data rates by:
comparing the maximum transmission power value for each STA to a decoding requirement threshold;
determining a highest common supported data rate for the BSS based on the comparing; and
adding or removing a data rate to or from the BSS Basic Rate Set for the AP to conform to the highest common supported data rate for the BSS.

19. An apparatus for adapting a Basic Service Set (BSS) Basic Rate Set for a Wireless Local Area Network (WLAN) Access Point (AP), comprising:
means for determining a transmission power metric for a plurality of Subscriber Stations (STAs) associated with the AP;
means for modifying one or more data rates in the BSS Basic Rate Set for the AP based on the transmission power metric; and
means for broadcasting the modified BSS Basic Rate Set in a beacon frame to each STA of the plurality of STAs in the BSS,
wherein the modified BSS Basic Rate Set reflects a highest supported rate common to all of the plurality of STAs associated with the AP for transmissions from the plurality of STAs to the AP.

20. The apparatus of claim 19, wherein the means for modifying the one or more data rates does not affect an Operational Rate Set established for any of the plurality of STAs.

21. The apparatus of claim 19, wherein the means for modifying the one or more data rates comprises means for adding or removing at least one data rate to or from the BSS Basic Rate Set for the AP.

22. The apparatus of claim 19, wherein the means for determining the transmission power metric comprises means for monitoring an uplink signal strength of packets received from the plurality of STAs.

23. The apparatus of claim 22, wherein the means for monitoring the uplink signal strength comprises means for building a histogram of signal strength measurements for each of the plurality of STAs over a designated time period.

24. The apparatus of claim 23, wherein the means for monitoring the uplink signal strength further comprises, for each of the plurality of STAs:
    means for determining from the corresponding histogram an order statistic reflective of channel conditions for the STA;
    means for calculating an expected Signal-to-Noise Ratio (SNR) for an uplink transmission from the STA based on the order statistic;
    means for comparing the expected SNR to a stored SNR associated with a decoding requirement for the uplink transmission; and
    means for determining a highest supported data rate for the STA for the uplink transmission based on the comparing.

25. The apparatus of claim 24, wherein the means for modifying the one or more data rates comprises:
    means for determining a lowest data rate among the highest supported data rates for the plurality of STAs, reflecting a highest common supported data rate for the BSS; and
    means for adding or removing a data rate to or from the BSS Basic Rate Set for the AP to conform to the highest common supported data rate for the BSS.

26. The apparatus of claim 19, wherein the means for determining the transmission power metric comprises means for reading a maximum transmission power value from a power capabilities element transmitted by each of the plurality of STAs.

27. The apparatus of claim 26, wherein the means for modifying the one or more data rates comprises:
    means for comparing the maximum transmission power value for each STA to a decoding requirement threshold;
    means for determining a highest common supported data rate for the BSS based on the comparing; and
    means for adding or removing a data rate to or from the BSS Basic Rate Set for the AP to conform to the highest common supported data rate for the BSS.

28. A non-transitory computer-readable medium comprising code, which, when executed by a processor, causes the processor to perform operations for adapting a Basic Service Set (BSS) Basic Rate Set for a Wireless Local Area Network (WLAN) Access Point (AP), the non-transitory computer-readable medium comprising:
    code for determining a transmission power metric for a plurality of Subscriber Stations (STAs) associated with the AP;
    code for modifying one or more data rates in the BSS Basic Rate Set for the AP based on the transmission power metric; and
    code for broadcasting the modified BSS Basic Rate Set in a beacon frame to each STA of the plurality of STAs in the BSS,
    wherein the modified BSS Basic Rate Set reflects a highest supported rate common to all of the plurality of STAs associated with the AP for transmissions from the plurality of STAs to the AP.

29. The non-transitory computer-readable medium of claim 28, wherein the code for modifying does not affect an Operational Rate Set established for any of the plurality of STAs.

30. The non-transitory computer-readable medium of claim 28, wherein the code for modifying comprises code for adding or removing at least one data rate to or from the BSS Basic Rate Set for the AP.

31. The non-transitory computer-readable medium of claim 28, wherein the code for determining the transmission power metric comprises code for monitoring an uplink signal strength of packets received from the plurality of STAs.

32. The non-transitory computer-readable medium of claim 31, wherein the code for monitoring the uplink signal strength comprises code for building a histogram of signal strength measurements for each of the plurality of STAs over a designated time period.

33. The non-transitory computer-readable medium of claim 32, wherein the code for monitoring the uplink signal strength further comprises, for each of the plurality of STAs:
    code for determining from the corresponding histogram an order statistic reflective of channel conditions for the STA;
    code for calculating an expected Signal-to-Noise Ratio (SNR) for an uplink transmission from the STA based on the order statistic;
    code for comparing the expected SNR to a stored SNR associated with a decoding requirement for the uplink transmission; and
    code for determining a highest supported data rate for the STA for the uplink transmission based on the comparing.

34. The non-transitory computer-readable medium of claim 33, wherein the code for modifying comprises:
    code for determining a lowest data rate among the highest supported data rates for the plurality of STAs, reflecting a highest common supported data rate for the BSS; and
    code for adding or removing a data rate to or from the BSS Basic Rate Set for the AP to conform to the highest common supported data rate for the BSS.

35. The non-transitory computer-readable medium of claim 28, wherein the code for determining the transmission power metric comprises code for reading a maximum transmission power value from a power capabilities element transmitted by each of the plurality of STAs.

36. The non-transitory computer-readable medium of claim 35, wherein the code for modifying the data rates comprises:
    code for comparing the maximum transmission power value for each STA to a decoding requirement threshold;
    code for determining a highest common supported data rate for the BSS based on the comparing; and
    code for adding or removing a data rate to or from the BSS Basic Rate Set for the AP to conform to the highest common supported data rate for the BSS.

37. The method of claim 1, wherein the BSS Basic Rate Set defines a set of data transfer rates required to be supported by the plurality of STAs in the BSS.

38. The apparatus of claim 10, wherein the BSS Basic Rate Set defines a set of data transfer rates required to be supported by the plurality of STAs in the BSS.

39. The apparatus of claim 19, wherein the BSS Basic Rate Set defines a set of data transfer rates required to be supported by the plurality of STAs in the BSS.

40. The non-transitory computer-readable medium of claim 28, wherein the BSS Basic Rate Set defines a set of data transfer rates required to be supported by the plurality of STAs in the BSS.

* * * * *